US011350346B2

(12) United States Patent
Yoshikawa

(10) Patent No.: US 11,350,346 B2
(45) Date of Patent: May 31, 2022

(54) COMMUNICATION APPARATUS, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventor: Yuki Yoshikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 16/803,009

(22) Filed: Feb. 27, 2020

(65) Prior Publication Data
US 2020/0205058 A1 Jun. 25, 2020

Related U.S. Application Data

(63) Continuation of application No. PCT/JP2018/025340, filed on Jul. 4, 2018.

(30) Foreign Application Priority Data

Aug. 31, 2017 (JP) .............................. JP2017-167770

(51) Int. Cl.
*H04W 48/08* (2009.01)
*H04W 84/20* (2009.01)
*H04W 76/14* (2018.01)
*H04W 48/16* (2009.01)
*H04W 84/18* (2009.01)

(52) U.S. Cl.
CPC .......... *H04W 48/08* (2013.01); *H04W 48/16* (2013.01); *H04W 76/14* (2018.02); *H04W 84/18* (2013.01)

(58) Field of Classification Search
CPC ..... H04W 48/08; H04W 76/14; H04W 48/16; H04W 84/18; H04W 88/04; H04W 76/27; H04W 8/005; H04W 84/12; H04W 84/20; H04W 8/22
See application file for complete search history.

(56) References Cited

U.S. PATENT DOCUMENTS 9,578,626 B2   2/2017   Sadasivam et al.
9,693,217 B2   6/2017   Kasslin et al.
(Continued)

FOREIGN PATENT DOCUMENTS

JP   2016514866 A   5/2016
JP   2017063313 A   3/2017
(Continued)

OTHER PUBLICATIONS

International Search Report issued in corresponding parent International Application No. PCT/JP2018/025340 dated Sep. 25, 2018.

*Primary Examiner* — Farid Seyedvosoghi
(74) *Attorney, Agent, or Firm* — Venable LLP

(57) ABSTRACT

A communication apparatus capable of at least one of reception and transmission of a predetermined radio signal as a proxy for another communication apparatus, the communication apparatus makes a notification of an allowable amount of a capability by which at least one of reception and transmission of the predetermined radio signal performed by the other communication apparatus can be performed as a proxy, as information regarding the capability, in a predetermined time period that comes periodically.

18 Claims, 12 Drawing Sheets

(56) References Cited

U.S. PATENT DOCUMENTS

| | | | |
|---|---|---|---|
| 10,091,640 B2 | 10/2018 | Park et al. | |
| 10,205,506 B2 | 2/2019 | Mogi et al. | |
| 10,511,953 B2 | 12/2019 | Yoshikawa | |
| 2014/0269658 A1* | 9/2014 | Sadasivam | H04W 4/80 370/338 |
| 2014/0302787 A1 | 10/2014 | Rantala et al. | |
| 2015/0081840 A1 | 3/2015 | Patil et al. | |
| 2016/0226928 A1 | 8/2016 | Park et al. | |
| 2016/0352842 A1 | 12/2016 | Patil et al. | |
| 2017/0093479 A1* | 3/2017 | Mogi | H04L 67/2814 |
| 2019/0320017 A1* | 10/2019 | Li | H04W 40/32 |
| 2019/0342416 A1 | 11/2019 | Yoshikawa | |
| 2020/0008095 A1* | 1/2020 | Patil | H04W 12/03 |

FOREIGN PATENT DOCUMENTS

| | | |
|---|---|---|
| WO | 2014150977 A | 9/2014 |
| WO | 2016171527 A | 10/2016 |
| WO | 2016191258 A | 12/2016 |
| WO | 2016191718 A | 12/2016 |

\* cited by examiner

COMMUNICATION APPARATUS, CONTROL METHOD THEREFOR, AND NON-TRANSITORY COMPUTER-READABLE STORAGE MEDIUM

CROSS-REFERENCE TO RELATED APPLICATIONS

This application is a Continuation of International Patent Application No. PCT/JP2018/025340, filed Jul. 4, 2018, which claims the benefit of Japanese Patent Application No. 2017-167770, filed Aug. 31, 2017, both of which are hereby incorporated by reference herein in their entirety.

BACKGROUND OF THE INVENTION

Field of the Invention

The present invention relates to a communication apparatus, a control method therefor, and a non-transitory computer-readable storage medium.

Background Art

Wireless LAN (Local Area Network) systems represented by IEEE802.11 have been widely utilized. In a wireless LAN, a network is controlled by a base station called an access point (AP). A wireless network is constituted by this AP and a station (STA) that is present in an AP radio wave reaching range and is in a wireless connection state. In recent years, not only conventional simple wireless network configurations constituted by such APs and STAs but also products and specification standards of various wireless LAN network forms have appeared.

Neighbor Awareness Networking (NAN) is defined by the Wi-Fi Alliance as a communication standard for discovering communication apparatuses, services provided by the communication apparatuses, and the like while saving power (PTL 1). In the NAN, time periods in which communication apparatuses (referred to as "NAN devices" hereinafter) constituting the NAN exchange information are synchronized with each other. Accordingly, it is possible to shorten a time for validating the wireless RF, and to realize power saving. In the NAN, a time period for the synchronization (synchronization period) is referred to as a "Discovery Window (DW)". Also, the cluster of the NAN devices by which a predetermined synchronization period is shared is referred to as a "NAN cluster".

A NAN device can operate in any one of the roles of the Master, Non-Master Sync, and Non-Master Non-Sync in the NAN cluster. NAN devices that operate as the Master and Non-Master Sync transmit a Synchronization Beacon (referred to as a "Sync Beacon" hereinafter) during a DW period. The Sync Beacon is a signal for making the NAN devices in the same NAN cluster being synchronized with each other. The NAN devices that join the NAN cluster are synchronized with each other in accordance with the Sync Beacon in the DW period for each predetermined period, and communicate service information in the DW period. Specifically, the NAN devices communicate, to each other, Subscribe messages, which are signals for discovering services, and Publish messages, which are signals for making a notification indicating that a service is provided, in the DW period. Also, the NAN devices can transmit and receive Follow-up messages for exchanging additional information regarding services in the DW period. Note that Publish, Subscribe, and Follow-up messages are collectively referred to as "Service Discovery Frames (SDFs). The NAN devices can advertise or detect services through exchange of SDFs.

Although the frequency of DW periods at which a radio signal is received out of all the DW periods depends on each NAN device, all of the NAN devices that join the NAN cluster need to be in a state in which the NAN devices can certainly receive radio signals in a special DW period called DW0. Note that the state in which a NAN device can receive a radio signal is referred to as an "AWAKE state" in the following description. DW0 is a DW period that comes in a cycle of once per 16 DW periods. Also, DW0 is a DW period that starts from the time when the lower 32 bit of the TSF (Time Synchronization Function), which is a counter timer used by the NAN cluster for synchronization, is 0x0. Also, the NAN devices that operate as the Master and Non-Master Sync need to transmit the Sync Beacons every DW period, and thus receive radio signals in all of the DW periods.

On the other hand, a NAN device that does not transmit the Sync Beacon every DW period operates as the Non-Master Non-Sync, and is not necessarily in an AWAKE state in all of the DW periods, and needs only to be in the AWAKE state only in the DW0. That is, such a NAN device does not necessarily receive radio signals in DW periods other than the DW0. Note that the state in which no radio signal is received is referred to as a "DOZE state" in the following description.

As described above, even in DW periods, the NAN device that is in the DOZE state is in a state in which the NAN device does not transmit or receive a radio signal, and thus it is possible to reduce power consumption. On the other hand, such a NAN device cannot transmit or receive Subscribe messages or Publish messages in DW periods in which the NAN device is in the DOZE state. Thus, a time period to when another NAN device discovers a service provided by the NAN device that is in the DOZE state may extend.

To address this, a method for making a request for searching and reporting a service to another NAN device, such as transmission of Subscribe messages and Publish messages, is proposed (PTL 2). A NAN device to which a request is made is referred to as a proxy server, and a NAN device that makes a request is referred to as a proxy client. In a case where a proxy server is requested by the proxy client to perform proxy transmission of service information (Publish messages and Subscribe messages), the proxy server transmits proxy client service information by proxy. The proxy client can enter the DOZE state for a longer period of time as a result of the proxy server executing searching and reporting a service, on behalf of the proxy client. Accordingly, it is possible to significantly reduce power consumption. Also, there are cases where even if a NAN device that searches for a service provided by the proxy client transmits a Subscribe message when the proxy client is in the DOZE state, the proxy server can make a response on behalf of the proxy client. Thus, the NAN device that searches for the service are more likely to be capable of discovering the service provided by the proxy client as a result of the proxy server making a response by proxy even if the proxy client is in the DOZE state.

CITATION LIST

Patent Literature

PTL1: US-2014-0302787
PTL2: US-2015-0081840

However, in terms of implementation, there is a limit to the capability (e.g., the amount of service information that can be transmitted and received) of a service performed by a proxy server by proxy (a proxy service). On the other hand, the proxy client did not have a way of knowing information regarding the capability of a proxy service of the proxy server. Thus, in a case where the amount of service information that can be transmitted and received reaches the upper limit, the proxy server cannot accept, from the proxy client, a request for performing transmission and reception of new service information as a proxy. That is, there is a possibility that transmission and reception of information relating to a new proxy service request made by the proxy client will be in vein.

In view of the above-described issues, the present disclosure provides a technique for a proxy client grasping information regarding the capability of a proxy service of a proxy server.

SUMMARY OF THE INVENTION

A communication apparatus of the present invention has the following configuration as means for achieving the above-described object. That is, a communication apparatus capable of at least one of reception and transmission of a predetermined radio signal as a proxy for another communication apparatus includes a notification unit configured to make a notification of an allowable amount of a capability by which at least one of reception and transmission of the predetermined radio signal performed by the other communication apparatus can be performed as a proxy, as information regarding the capability, in a predetermined time period that comes periodically.

Further features of the present invention will become apparent from the following description of exemplary embodiments with reference to the attached drawings.

BRIEF DESCRIPTION OF THE DRAWINGS

The accompanying drawings are included in and constitute a part of the specification, illustrate embodiments of the present invention, and are used together with the description thereof to explain the principle of the invention.

DESCRIPTION OF THE EMBODIMENTS

Figure 1:
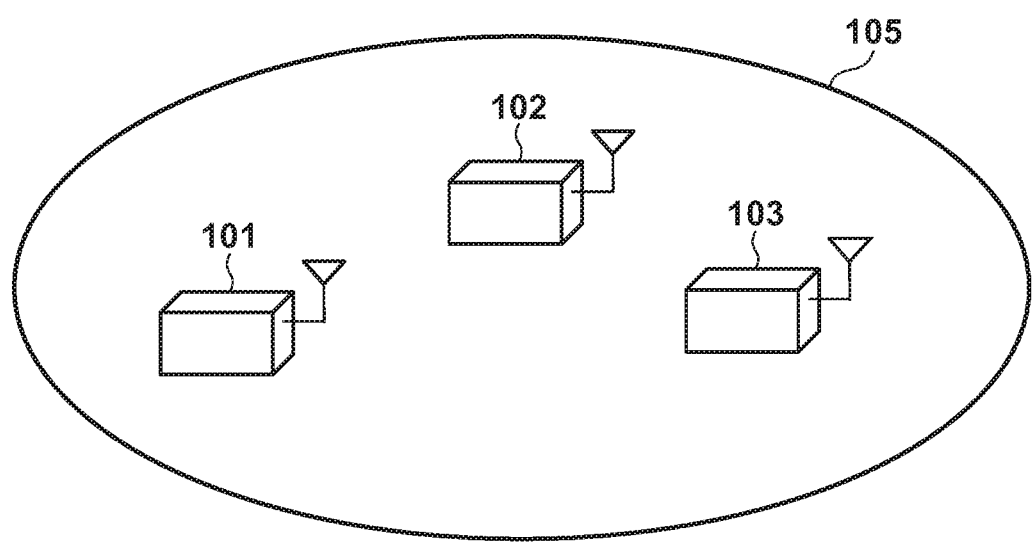
FIG. 1 is a diagram showing a configuration of a wireless network in an embodiment.

Hereinafter, the present invention will be described in detail based on an embodiment thereof with reference to the accompanying drawings. Note that each communication apparatus is a terminal having a communication function of wireless LAN conforming to IEEE802.11 standard series hereinafter, but is not limited thereto. Also, although each communication apparatus described below is a NAN device that conforms to Neighbor Awareness Networking (NAN) by Wi-Fi Alliance and can discover other communication apparatuses and services provided by the other communication apparatuses, the communication apparatus is not limited thereto. That is, although technical terms corresponding to a predetermined standard are used in the following description, it is possible to provide the following discussions in other standards of the same type.

First, NAN will be described in more detail. Communication apparatuses (NAN devices) that belong to a NAN cluster operate in any of the roles of Master, Non-Master Sync, and Non-Master Non-Sync. The NAN device that operates as the Master transmits the Sync Beacon, which is a beacon for NAN devices identifying a DW, which is a predetermined time period that comes periodically, and synchronizing with each other. Also, the NAN device that operates as the Master transmits the Discovery Beacon, which is a signal for making a terminal that does not belong to the NAN cluster recognize the NAN cluster. The Discovery Beacon is transmitted every 100 TUs (Time Units, 1 TU indicates 1024μ seconds), even out of a DW period, for example. Note that at least one NAN device operates as the Master in each NAN cluster. The NAN device that operates as the Non-Master Sync transmits the Sync Beacon, but does not transmit the Discovery Beacon. The NAN device that operates as the Non-Master Non-Sync does not transmit the Sync Beacon or Discovery Beacon.

The likelihood of operating as the Master, Non-Master Sync, or Non-Master non-Sync in a NAN cluster is determined by a Master Rank defined in the NAN standards. Specifically, the Master Rank is determined using the following equation from the Master Preference set for each NAN device, a Random Factor that is a random value, and the MAC of an interface address. Master Rank= Master Preference*2^56+Random Factor*2^48+MAC[5]* 2^40+ . . . +MAC[0]. A NAN device with a higher Master Rank is more likely to play the role of the Master, and a NAN device with a lower Master Rank is more likely to play the role of the Non-Master Non-Sync. In particular, a NAN device with the highest Master Rank in the NAN cluster is a device that is called Anchor Master and serves as a time reference in the NAN cluster. In the NAN standards, a NAN device that stably joins the NAN cluster, or for example, a NAN device that is driven using a power source and does not move is recommended to have a higher Master Rank. Also, a NAN device that is driven by a battery, and a NAN device that may not be stably present in the NAN cluster, such as a mobile terminal, is recommended to have a lower Master Rank. The NAN cluster can be stably maintained as a result of a NAN device that is stably present becoming the Master and transmitting a synchronization signal.

In this embodiment, a mode is considered in which in order that the proxy client grasps information regarding the capability of a proxy service of a proxy server, the proxy server makes a report of this information in advance. In this embodiment, the proxy server makes a notification of, as information regarding the capability of a proxy service, an allowable amount (an allowable amount (a reserve amount) of the proxy service hereinafter) of the capability by which at least one of reception and transmission of service information (a radio signal) can be performed as a proxy. The proxy server can register a proxy service requested by the proxy client until the capability reaches the proxy service allowable amount. As a result of making a report of the proxy service allowable amount, the proxy client can make a proxy service registration request as appropriate. Also, when the proxy client receives, from a plurality of proxy servers, pieces of information indicating that proxy services can be performed, the pieces of information serve as materials for selecting which proxy server performs a service. That is, in this embodiment, a configuration is adopted in which the proxy server makes a report of the proxy service allowable amount, and the proxy client selects the proxy server to which a request for a proxy is to be made, from a plurality of proxy servers based on the report.

The following describes the configurations of a wireless communication system and a communication apparatus that are common in embodiments, and then describes the flow of processing according to the embodiments.

Configuration of Wireless Communication System

First, a configuration example of a wireless communication system according to this embodiment will be described with reference to FIG. 1. The wireless communication system according to this embodiment is configured including a NAN device 101 to a NAN device 103, which are communication apparatuses conforming to the NAN standards, and the NAN devices 101 to 103 join a NAN cluster 105. The NAN devices (the NAN devices 101 to 103) joining the NAN cluster 105 construct a network with a frequency channel 6 (6ch). Here, the NAN cluster 105 is a NAN cluster in which the length of a DW period is 16 TUs, and a time interval starting from a start timing of a DW period to a start timing of the next DW period is 512 TUs. Also, the DW period is a period in which 16 DW periods of DW0 to DW15 are regarded as one cycle, and a DW period after DWn (where n indicates an integer of 0 to 15) by 16 DW periods is also DWn. It is assumed that all of the NAN devices joining the NAN cluster 105 certainly receive radio signals in the DW0. Note that the wireless channel of NAN and the configuration of DW are not limited thereto.

The NAN device 101 and the NAN device 103 can discover surrounding communication apparatuses and services provided thereby based on the NAN standards, and provide information regarding services that can be provided by the NAN devices 101 and 103. Also, the NAN device 101 and the NAN device 103 can operate as proxy servers that can execute, by proxy, searching for and making a report of services of other NAN devices. Also, the NAN device 101 and the NAN device 103 can perform wireless communication in all DWs, and transmit Publish messages for indicating that the NAN devices 101 and 103 have the function of the proxy server in all DWs. It is assumed that the NAN device 101 joins the NAN cluster 105 as the Master. It is assumed that the NAN device 103 is joining the NAN cluster 105 as the Non-Master Non-Sync. Also, it is assumed that the Master Rank of the NAN device 101 is higher than that of the NAN device 103.

The NAN device 102 is a communication apparatus that joins the NAN cluster 105 as the Non-Master Non-Sync. It is assumed that the NAN device 102 operates as a proxy client that makes, to other NAN devices, a request for searching and reporting a service. If the NAN device 102 has the function of a printer, the NAN device 102 can request the other NAN devices to make a report of a printer service, for example.

Functional Configuration of NAN Device 101

Figure 2A:
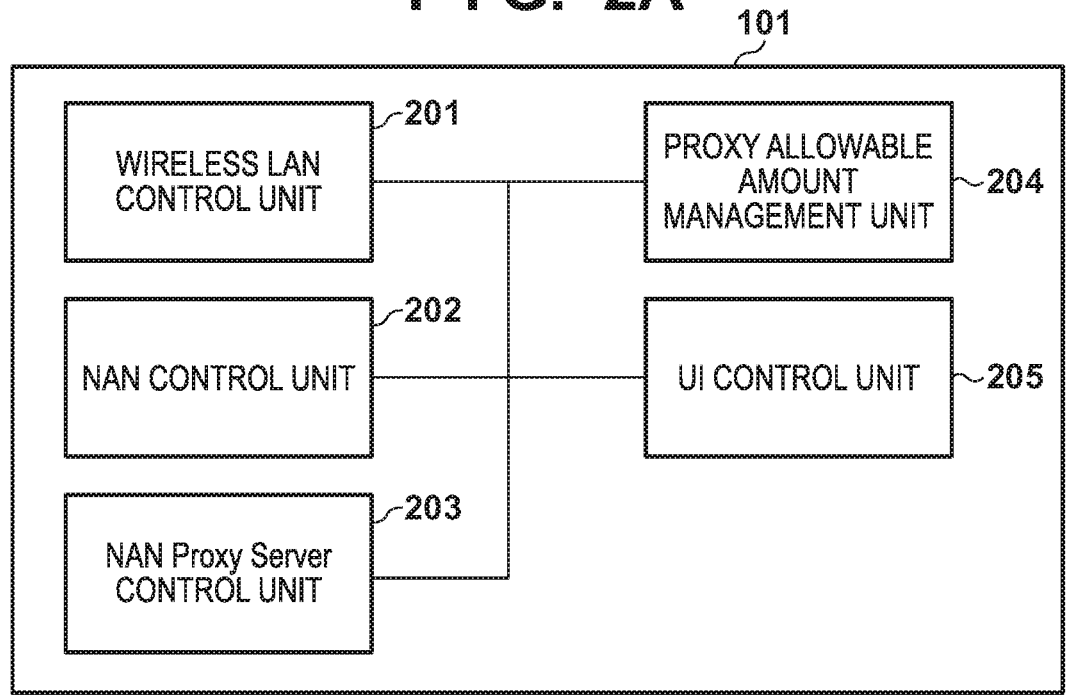
FIG. 2A is a diagram showing a functional configuration of a NAN device 101 in an embodiment.

FIG. 2A shows a functional configuration of the NAN device 101. Note that the functional configuration of the NAN device 103 is the same as that of the NAN device 101. The NAN device 101 includes, as one example of the functional configuration thereof, a wireless LAN controller 201, a NAN controller 202, a NAN proxy server controller 203, a proxy allowable amount management unit 204, and a UI controller 205.

The wireless LAN controller 201 controls transmission and reception of radio signals with the other wireless LAN devices. The wireless LAN controller 201 executes a wireless LAN communication control in accordance with the IEEE 802.11 standard series. The NAN controller 202 performs a control according to the NAN standards. The NAN controller 202 performs a communication control according to the NAN standards via a communication unit 306 (FIG. 3), for example. The NAN proxy server controller 203 controls the NAN controller 202, and realizes the Proxy function of performing execution of searching and reporting a service as a proxy for other NAN devices. A proxy allowable amount management unit 204 manages the proxy service allowable amount based on information received from the NAN controller 212. The UI controller 205 manages operations performed on the input unit 304 (FIG. 3) by a user of the NAN device 101, and transmits necessary signals to the other controllers 201 to 204.

Functional Configuration of NAN Device 102

Figure 2B:
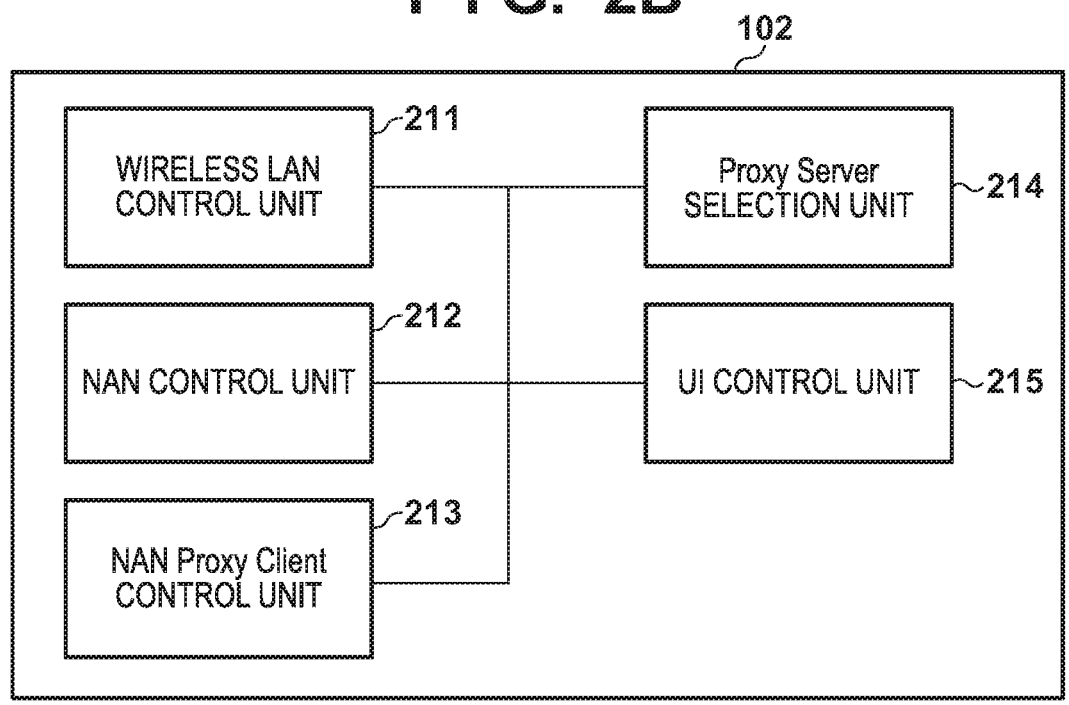
FIG. 2B is a diagram showing a functional configuration of a NAN device 102 in an embodiment.

FIG. 2B shown a configuration of the NAN device 102. The NAN device 102 includes, as one example of the functional configuration thereof, a wireless LAN controller 211, a NAN controller 212, a NAN proxy client controller 213, a proxy server selection unit 214, and a UI controller 215. The wireless LAN controller 211, the NAN controller 212, and the UI controller 215 are the same as the wireless LAN controller 201, the NAN controller 202, and the UI controller 205, which are constituent elements of the NAN device 101 in FIG. 2A, and thus a description thereof is omitted. The NAN proxy client controller 213 controls the NAN controller 212, and realizes the Client function of making a request to the other NAN devices to be a proxy of searching and reporting a service. The proxy server selection unit 214 selects a proxy server to which a request for a proxy service is made, based on information received by the NAN controller 212.

Hardware Configuration of NAN Devices 101 to 103

Figure 3:
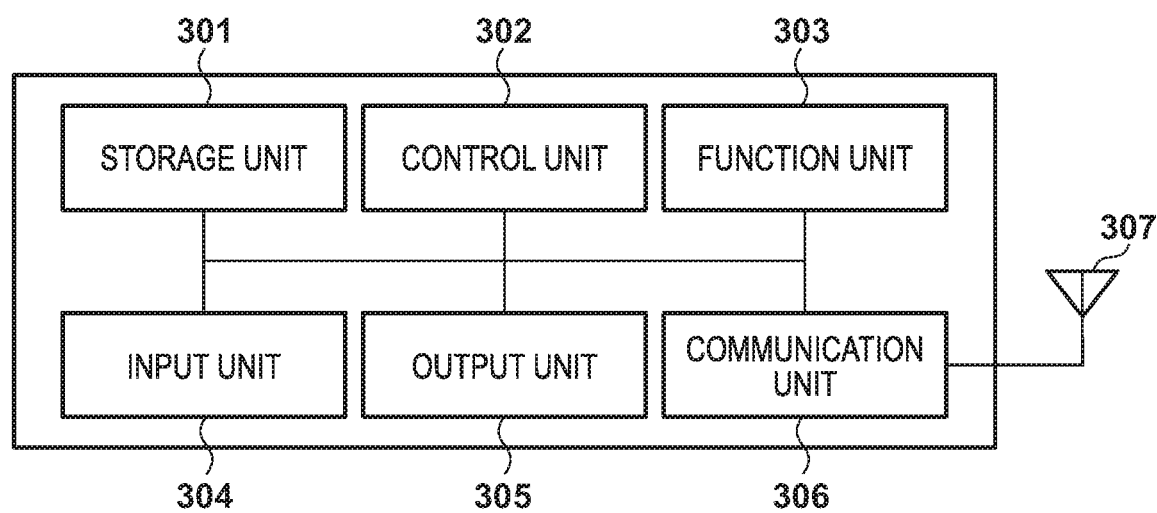
FIG. 3 is a diagram showing a hardware configuration of a NAN device in an embodiment.

A hardware configuration of the NAN device 101 is shown in FIG. 3. Note that the hardware configurations of the NAN devices 102 and 103 are the same as that of the NAN device 101. The NAN device 101 includes, as an example of the hardware configuration thereof, a storage unit 301, a controller 302, a functional unit 303, an input unit 304, an output unit 305, a communication unit 306, and an antenna 307.

The storage unit 301 is constituted by both or either one of a ROM (Read Only Memory) and a RAM (Random Access Memory), and stores programs for performing various operations, which will be described later, and various types of information such as communication parameters for wireless communication and the like. Note that in addition to the memories such as a ROM and a RAM, a storage medium such as a flexible disk, a hard disk, an optical disk, a magneto-optical disk, a CD-ROM, a CD-R, a magnetic tape, a non-volatile memory card, or a DVD may be used as the storage unit 301.

The controller 302 is constituted by a CPU (Central Processing Unit) or an MPU (Micro Processing Unit), and performs overall control of the NAN device 101 by executing programs stored in the storage unit 301. Note that the controller 302 may perform overall control of the NAN device 101 through cooperation between programs stored in the storage unit 301 and an OS (Operating System). Also, the controller 302 controls the functional unit 303 and executes predetermined processing such as image capture, printing, and projection.

The functional unit 303 is hardware for the NAN device 101 to execute predetermined processing. In a case where the NAN device 101 is a camera, for example, the functional unit 303 is an image capture unit and performs image capture processing. Also, in a case where the NAN device 101 is a printer, for example, the functional unit 303 is a printing unit and performs printing processing. Also, in a case where the NAN device 101 is a projector, for example, the functional unit 303 is a projection unit and performs projection processing. Data processed by the functional unit 303 may be data stored in the storage unit 301, or data communicated with another NAN device via the communication unit 306, which will be described later.

The input unit 304 accepts various operations from a user. The output unit 305 performs various outputs to a user. Here, an output performed by the output unit 305 includes at least one of display on a screen, an audio output using a speaker, a vibration output, and the like. Note that like a touch panel, both the input unit 304 and the output unit 305 may be realized by one module.

The communication unit 306 performs wireless communication conforming to the IEEE802.11 series, and IP (Internet Protocol) communication. Also, the communication unit 306 controls the antenna 307 and performs transmission and reception of radio signals for wireless communication. The NAN device 101 can communicate contents such as image data, document data, and video data with the other NAN devices via the communication unit 306.

Flow of Processing

Next, embodiments of the flow of processing executed by the NAN device 101 as described above, a sequence in a wireless communication system, and the like will be described.

Embodiment 1

In this embodiment, the NAN device 101 transmits a Publish message for indicating that the NAN device 101 has a proxy server function, a proxy service allowable amount (the amount of a service that can be registered by the proxy server) being included in the Publish message. Accordingly, when the proxy client receives Publish messages from a plurality of proxy servers, the proxy client can appropriately determine which proxy server to make a proxy request to.

In this embodiment, the NAN device 101 manages the proxy service allowable amount in units of service (performing at least one of reception and transmission of service information), and makes a report in the form of how many other services can be registered. The NAN device 101 may manage the proxy service allowable amounts in units other than units of service. The NAN device 101 may transmit, as the proxy service allowable amount, a reserve amount of the size of packets in units of the size of a packet (e.g., a byte) that includes service information and can be transmitted at one time, for example. Accordingly, even for services with variable packet occupancy, the NAN device 101 can change the proxy service allowable amount according to circumstances.

Operations of Proxy Server

Figure 4:
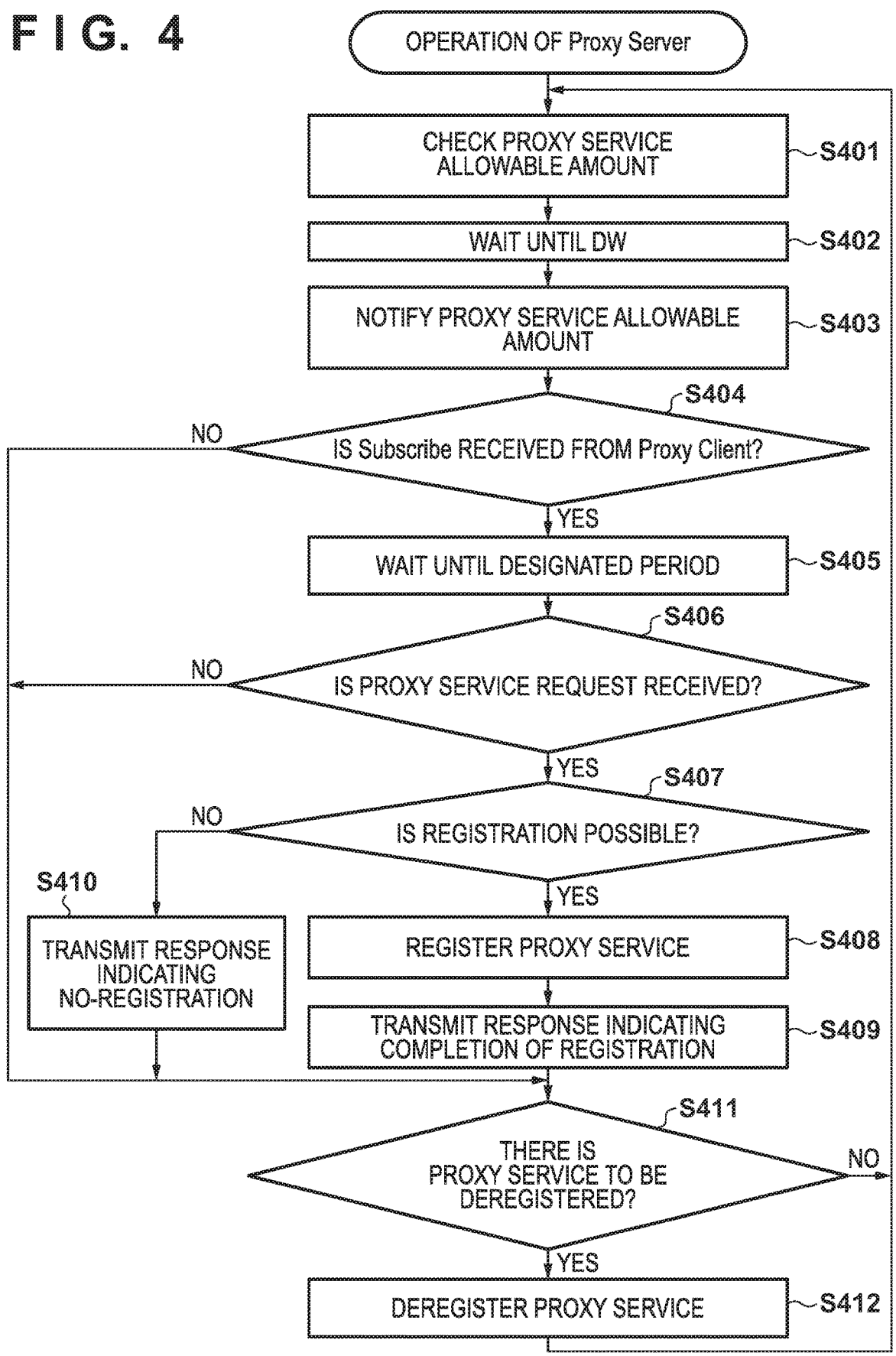
FIG. 4 is a flowchart of operations of a proxy server in Embodiment 1.

A flowchart of operations of the NAN device 101 (proxy server) in this embodiment is shown in FIG. 4. Specifically, FIG. 4 shows processing performed when the NAN device 101 manages the proxy service allowable amount and makes a report to the surroundings.

The flowchart shown in FIG. 4 is realized as a result of the controller 302 of the NAN device 101 executing a control program stored in the storage unit 301 and executing calculation and processing on information and controlling of hardware. Note that a configuration may be adopted in which a portion or all of the steps shown in the flowchart shown in FIG. 4 may be realized by hardware such as an ASIC, for example. This processing can be started at a point of time when the NAN device 101 joins the NAN cluster 105 and starts operation as the proxy server. Although the processing of the NAN device 101 will be described hereinafter, the NAN device 103 also can perform similar processing.

First, the proxy allowable amount management unit 204 of the NAN device 101 checks the proxy service allowable amount thereof (step S401). Here, the proxy service allowable amount is set to 5. This means that the NAN device 101 can search for (Subscribe) or makes a report (Publish) of five other services by proxy, for example. After the NAN device 101 has waited until the next DW (step S402), the NAN controller 202 of the NAN device 101 makes a report to the surroundings in a Publish message that the NAN device 101 can operate as the proxy server (that is, have a proxy server function) (step S403). At this time, the NAN device 101 uses a frame having the configuration shown in FIG. 7 as an example.

Figure 7:
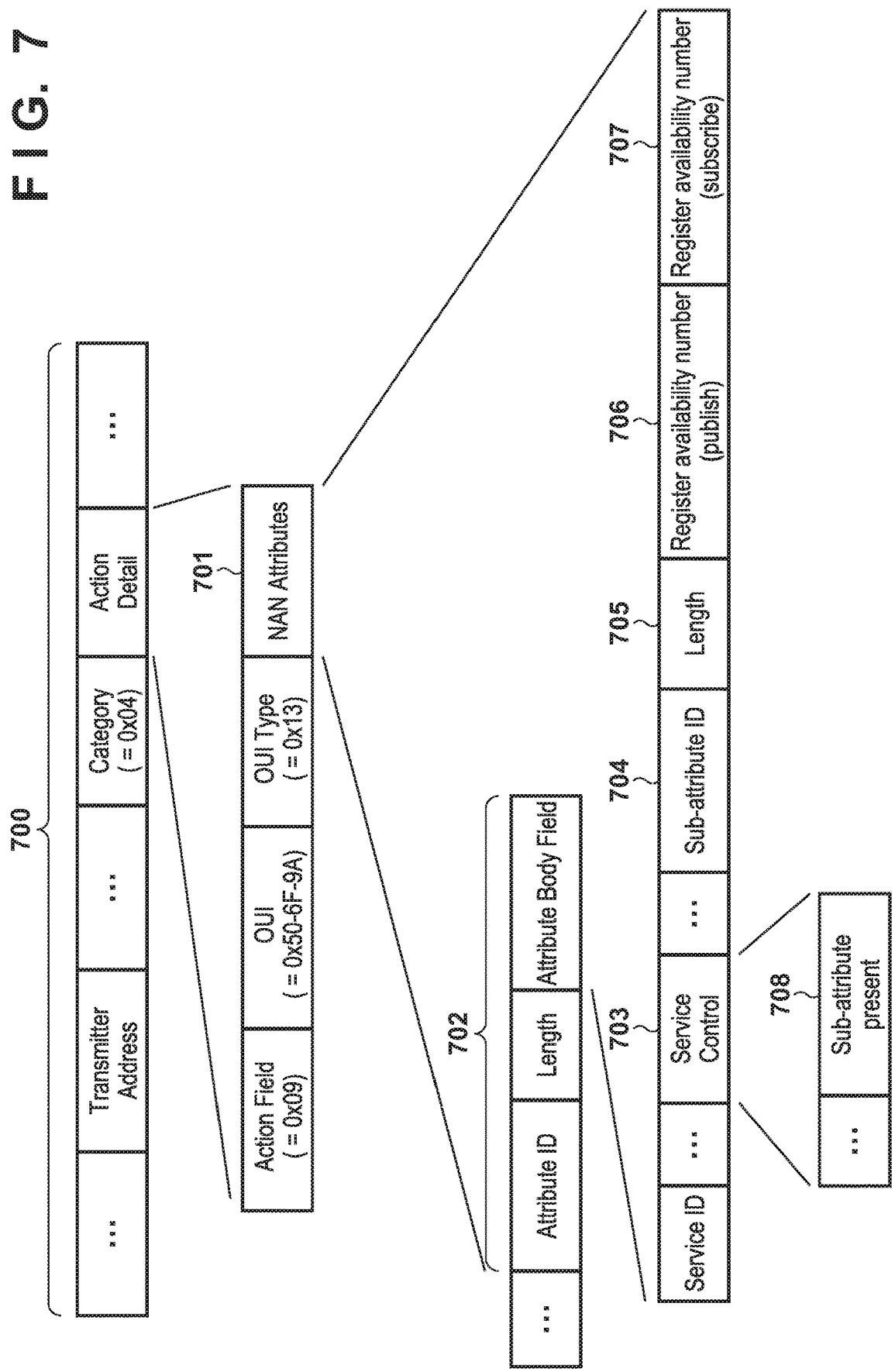
FIG. 7 shows an example of a frame configuration of a Publish message in an embodiment.

FIG. 7 shows an example of a frame configuration of a Publish message, which is an SDF transmitted by a NAN device. Note that information included in the frame configuration shown in FIG. 7 may be transmitted using another signal (timing) other than the Publish message. In a case where the NAN device 101 operates as the Master, for example, these pieces of information may be transmitted using the Sync Beacon or Discovery Beacon. Alternatively, a Follow up message, which is an SDF, or a frame used when data is transmitted after a NAN data link is established may be utilized.

In this example, the Public Action Frame of the IEEE802.11 standard is used as the SDF. The SDF includes NAN Attributes 701 for adding information defined in a portion of the Public Action Frame. A Service Descriptor Attribute indicating details of a service that is to be searched for is included in one of the plurality of Attributes 702. Note that other Attributes may be used or used in combination in order to indicate that a NAN device is joining another network. A form obtained by partially changing the Service Descriptor Attribute is shown in FIG. 7, for example. A Service Control field 703 of the Service Descriptor Attribute indicates the provision of a Sub-attribute. Note that the 7th bit that is not currently used (Sub-attribute present 708) is used in order to indicate that the Sub-attribute is present. Sub-Attributes (reference numerals 704 to 707) are provided to the Service Descriptor Attribute based thereon.

A Sub-attribute ID 704 indicates the ID for indicating that the Sub-attribute indicates the allowable amount of a proxy service that can be registered by the proxy server. 0x07 is written in the Sub-attribute ID, for example. The Length 705 indicates the length of the Sub-Attribute. 0x4 obtained through addition of the length of the Register availability number (publish) 706 and the length of the Register availability number (subscribe) 707 is written in the Length 705, for example. The Register availability number (publish) 706 indicates the allowable amount of a service that can be performed as a proxy to Publish (make a report of a service), out of the allowable amounts of proxy services. 0x05 is written in the Register availability number (publish) 706, for example. The Register availability number (subscribe) 707 indicates the allowable amount of a proxy service as Subscribe (a service search), out of the allowable amounts of proxy services. 0x00 is written in the Register availability number (subscribe) 707, for example. Note that the way for indicating the allowable amount described here is an example. The proxy service allowable amount obtained through a combination of Publish and Subscribe may be written, for example. Alternatively, another Attribute may be prepared and the proxy service allowable amount may be written therein.

In addition to the information shown in FIG. 7, an Attribute for designating a channel or a time period out of DW, such as a Further NAN Service Discovery Attribute, may be added to a Publish message for transmission. Also, a proxy service request and response, which will be described later, may be transmitted and received through the channel and in the time period added here.

Return to FIG. 4. In step S403, the NAN controller 202 of the NAN device 101 transmits the proxy service allowable amount checked in step S401, the allowable amount being included in the Publish message. Accordingly, the proxy client that has received the Publish message can select which proxy server to make a request for a proxy service to. Also, the NAN device 101 can designate, in the Publish message, a time period in which the proxy service request processing is performed (referred to as a "proxy service registration period" hereinafter) and a frequency channel Although registration processing is performed in a DW in this embodiment, the NAN device 101 may designate a proxy service registration period out of the DW. Also, the proxy service registration period and the frequency channel may be designated using another method. The NAN device 102 may designate the proxy service registration period and the frequency channel in the Follow Up message, which is a reply to the reception of the Publish message, for example. Alternatively, the NAN device 101 may designate the proxy service registration period and the frequency channel in the Follow Up message or the Publish message, which is a response to the Subscribe message or the Follow Up message that is transmitted from the proxy client.

Then, the NAN device 101 determines whether or not the NAN device 101 has received, from the proxy client, the Subscribe message indicating that the proxy service is searched for (step S404). Note that this process may be omitted. When the NAN device 101 transmits the Publish message (when further receiving the Subscribe message in a case of performing step S404), the NAN device 101 waits until a proxy service registration period designated in the Publish message (step S405). Note that in a case where the channel and the proxy service registration period are not designated in the Publish message, the NAN device 101 waits until the next DW. Also, if the designated proxy service registration period comes after the next DW, the NAN device 101 may perform processing of step S403 in the next DW.

When the NAN controller 202 of the NAN device 101 has waited until the designated proxy service registration period, the NAN controller 202 determines whether or not a proxy service request has been received (step S406). In a case where the proxy service request has been received (Yes in step S406), the NAN proxy server controller 203 of the NAN device 101 analyzes the request content, and determines whether or not this service can be accepted and registered. That is, the NAN device 101 determines whether searching or reporting can be performed as a proxy (step S407). If the service can be registered (Yes in step S407), the proxy allowable amount management unit 204 of the NAN device 101 registers the proxy service (step S408), and the NAN controller 202 transmits a response indicating that the service has been registered (step S409). If the service cannot be registered (No in step S407), the NAN controller 202 of the NAN device 101 transmits a response indicating the service has not been registered (step S410).

Then, the proxy allowable amount management unit 204 of the NAN device 101 checks whether there are any registered proxy services that are to be deregistered due to the expiration (step S411). In a case where there is a proxy service to be deregistered (Yes in step S411), the proxy allowable amount management unit 204 of the NAN device 101 deregisters the proxy service (step S412). If there is no proxy service to be deregistered (No in step S411), the proxy allowable amount management unit 204 of the NAN device 101 checks the proxy service allowable amount again (step S401), and the NAN controller 202 transmits a Publish message including the proxy service allowable amount that has been checked (step S403). In a case where one proxy service is newly registered through this series of processes, the proxy service allowable amount decreases from 5 to 4, for example. In contrast, in a case where there is one proxy service that is to be deregistered, the proxy service allowable amount increases from 5 to 6, for example.

Operations of Proxy Client

Figure 5:
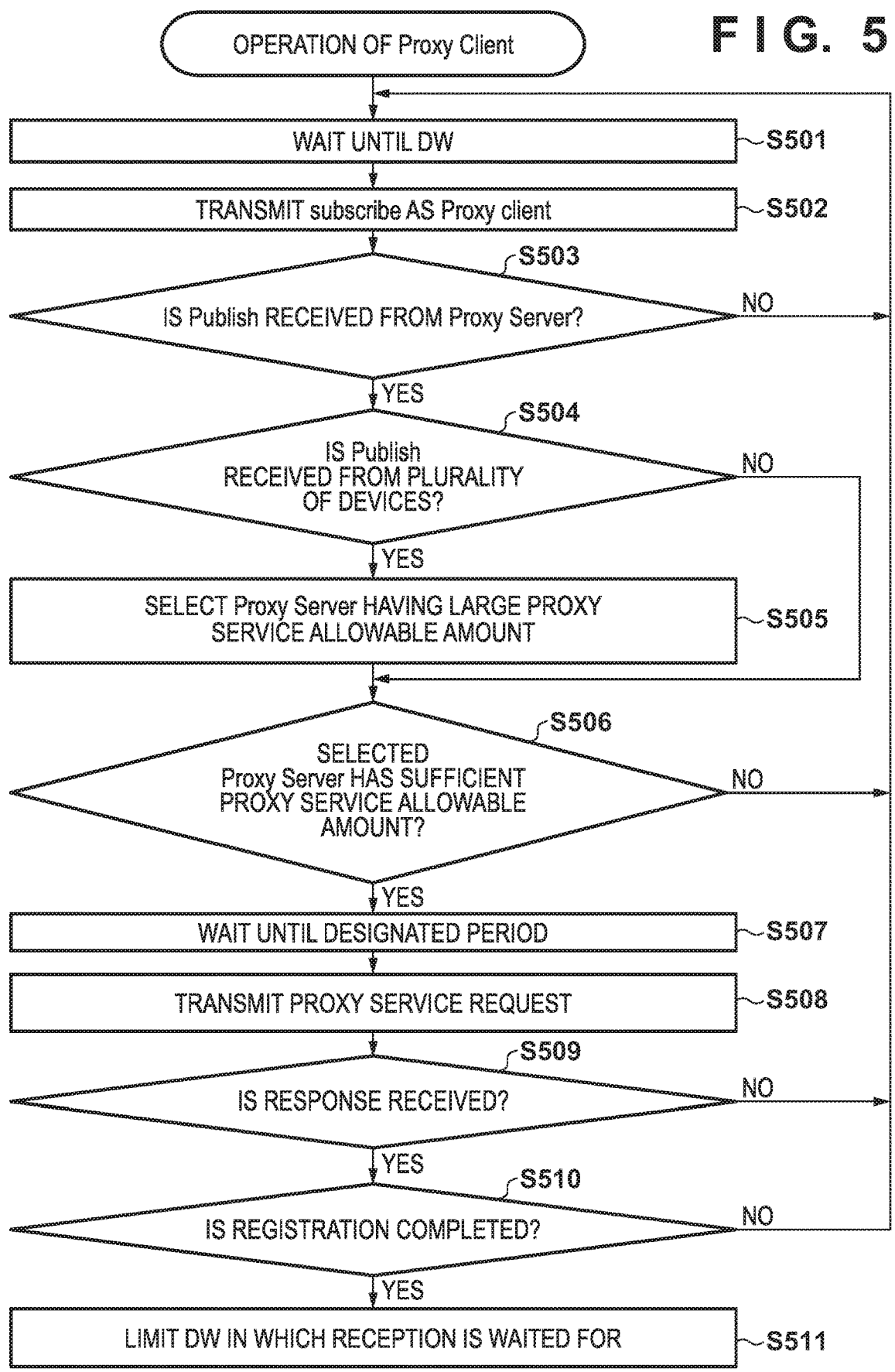
FIG. 5 is a flowchart of operations of a proxy client in Embodiment 1.

A flowchart of operations of the NAN device 102 (proxy client) in this embodiment is shown in FIG. 5. Specifically, FIG. 5 shows processing regarding the NAN device 102 receiving the allowable amounts of proxy services from the NAN device 101 and the NAN device 103 and selecting a proxy server to which a request for a proxy is made. Note that the allowable amounts of the proxy services of the NAN device 101 are set to 5 for Publish and 5 for Subscribe. On the other hand, the allowable amounts of the proxy services of the NAN device 103 are set to 3 for Publish and 2 for Subscribe. Also, in the description of FIG. 5, it is assumed that the NAN device 102 makes a request for reporting (Publishing) a printer service to be performed as a proxy that is a service of the NAN device 102.

The flowchart shown in FIG. 5 is realized as a result of the controller 302 of the NAN device 102 executing a control program stored in the storage unit 301 and executing calculation and processing on information and controlling of hardware. Note that a configuration may be adopted in which a portion or all of the steps shown in the flowchart shown in FIG. 5 may be realized by hardware such as an ASIC, for example. This processing can be started at a point of time when the NAN device 102 joins the NAN cluster 105 and starts operation as the proxy client.

First, the NAN controller 212 of the NAN device 102 waits until a DW (step S501), and then makes an indication with a Subscribe message that the NAN controller 212 is to make a request for searching and reporting a service as a proxy therefor (that is, is searching for a proxy server) (step S502). Note that this process may be omitted. Then, the NAN controller 212 of the NAN device 102 checks whether or not a Publish message indicating that a proxy server function is provided has been received (step S503). The proxy service allowable amount is written in the Publish message according to FIG. 7 above, as an example.

Then, the NAN controller 212 of the NAN device 102 determines whether or not the Publish messages indicating that the proxy server function is provided have been received from the plurality of NAN devices (step S504). In a case where the Publish messages have been received from the plurality of NAN devices (Yes in step S504), the proxy server selection unit 214 of the NAN device 102 performs proxy server selection processing (step S505). Specifically, the proxy server selection unit 214 of the NAN device 102 analyzes the received messages (the frame in the form shown in FIG. 7, for example), and selects a proxy server having a large proxy service allowable amount, out of the proxy servers. In this example, the NAN device 102 makes a request for Publish of a printer service to be performed as a proxy. Thus, the proxy server selection unit 214 of the NAN device 102 determines to make a request to the NAN device 101 having a larger Publish proxy service allowable amount.

Then, the NAN proxy client controller 213 of the NAN device 101 determines whether the proxy server selected in step S505 has a sufficient proxy service allowable amount. In a case where there are three services for which a request is to be made and that are to be performed as a proxy, whereas the selected proxy server can provide one proxy service, it cannot be said that the proxy service allowable amount thereof is sufficient. In contrast, if the selected proxy server can provide 5 proxy services, it can be said that the proxy service allowable amount thereof is sufficient. If the proxy service allowable amount is not sufficient (No in step S506), the processing returns to step S501 again in order to discover an appropriate proxy server.

Although this embodiment is described such that in a case where the proxy service allowable amount is not sufficient (No in step S506), another proxy server is searched for, the present invention is not limited thereto. For example, the NAN device 102 may give priorities to services for which a request is to be made and that are to be performed as a proxy, and make requests for proxy services with higher priorities in the descending order of priority as much as possible. A case where the NAN device 102 is to make a request for three services to be performed as a proxy and a proxy server can provide one proxy service is considered, for example. If the NAN device 102 gives priorities thereto, the NAN device 102 may make a request only for the service with the highest priority to the proxy server. Alternatively, in a case where the NAN device 102 has received Publish messages from a plurality of proxy servers, it is conceivable to divide the services that are to be individually requested. In a case where the NAN device 102 has received the Publish messages from the NAN device 101 and the NAN device 103, the NAN device 102 may make a request, to the NAN device 101, for two of the services that are to be requested, and make a request, to the NAN device 103, for one of the services that are to be requested and for which a request was not made to the NAN device 101, for example. Accordingly, the NAN device 102 can make a request for all of the services for which a request is to be made and that are to be performed as a proxy. Also, if priorities are given to the services that are to be requested at this time, it is possible to perform processing for making a request for a service with a higher priority to a proxy server having higher radio wave reception. Accordingly, it is possible to make a request for a service with a higher priority to a proxy server that has a closer positional relationship or emits stronger radio waves.

Return to the description of FIG. 5. In a case where it is determined that the proxy server has the proxy service allowable amount (Yes in step S506), the NAN controller 212 of the NAN device 102 waits until the proxy service registration period designated by the proxy server (step S507). In a case where the proxy service registration period is not designated, the NAN controller 212 of the NAN device 102 determines that the next DW is a designated period and waits until the next DW. After the NAN controller 212 of the NAN device 102 has waited until the designated period, the NAN controller 212 transmits a proxy service request (registration request) (in a designated frequency channel if designated) (step S508).

After the NAN controller 212 of the NAN device 102 has transmitted the proxy service request, the NAN controller 212 checks whether a response has been received (step S509). In a case where no response is received even if a certain time has passed (No in step S509), the processing returns to step S501, and the NAN device 102 searches for a new proxy server again. In a case where a response has been received (Yes in step S509), the NAN controller 212 of the NAN device 102 analyzes the content of the response and determines whether the response indicates the completion of registration (step S510). In a case where the response indicates the completion of registration, the NAN controller 212 of the NAN device 102 determines that the proxy request has completed, and further limits a DW (DW in an AWAKE state) in which reception is waited for (step S511). Note that this process may be omitted. Also, in a case where the NAN device 102 makes a registration request for only a portion of the services that are to be requested in step S508, the processing may move to processing for searching for a proxy server again.

In a case where the response does not indicate the completion of registration in step S510 (in a case where the response indicates a refusal of registration (No in step S510), the processing returns to step S501, and the NAN device 102 starts to search for a proxy server again. At this time, the NAN device 102 may remove the proxy server that has received the refusal notification, from proxy servers to be searched for. Also, in a case where the NAN device 102 has discovered a plurality of proxy servers, the NAN device 102 may transmit a proxy service request to the other proxy servers at that time. Also, as a result of analyzing the content of the response, the NAN device 102 may transmit a proxy service request to the same proxy server again depending on the reasons of the refusal response. If the reason of the registration refusal is "a time is required due to waiting for processing", for example, the NAN device 102 may transmit a proxy service request after a certain period of time.

Processing Sequence

Figure 6:
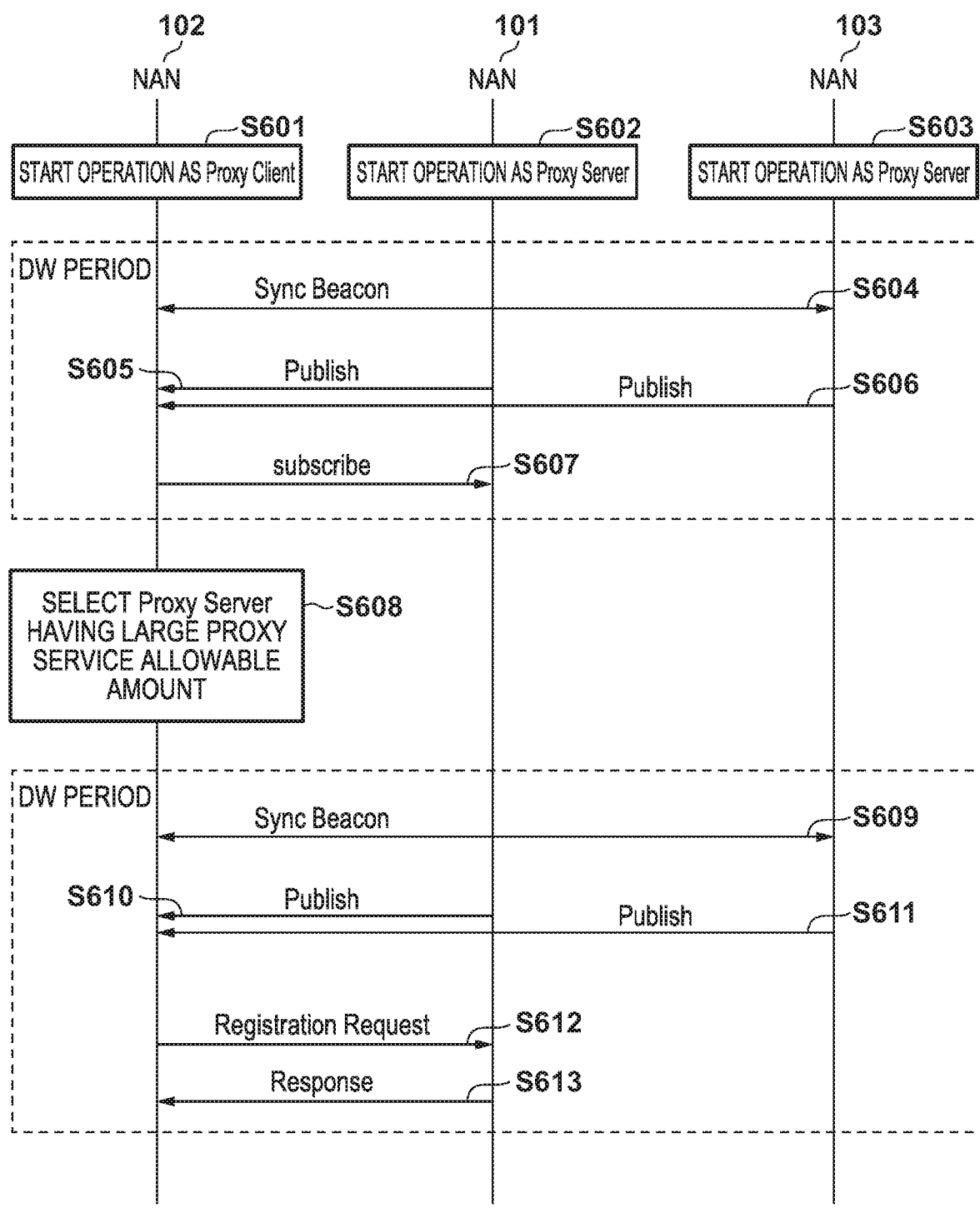
FIG. 6 is a diagram of a processing sequence in Embodiment 1.

A sequence until a proxy request is completed in the processing shown in FIGS. 4 and 5 is shown in FIG. 6. First, the NAN device 101 and the NAN device 103 start operations as proxy servers, and the NAN device 102 starts operation as the proxy client (steps S601 to S603). When a DW period starts, the NAN device 101 operating as the Master transmits a Sync Beacon (step S604).

Then, the NAN device 101 and the NAN device 103 each transmit a Publish message (e.g. the frame configuration shown in FIG. 7) indicating that they can provide the function as proxy servers. Note that it is assumed that a proxy service registration period is not designated in the Publish message here. On the other hand, the NAN device 102 transmits a Subscribe message indicating that the NAN device 102 searches for a proxy server as the proxy client (step S607). The NAN device 102 receives Publish messages from a plurality of proxy servers, and thus perform processing for selecting a proxy server (step S608). Here, because the NAN device 101 has a larger allowable amount of a Publish proxy service, the NAN device 102 selects the NAN device 101 as the proxy server. Because the proxy service registration period is not designated in the Publish message, the NAN device 102 waits until the next DW, and then transmits a proxy service request (registration request) (step S612). The NAN device 101 determines whether the proxy service can be registered internally, and when the proxy service is registered, transmits a response indicating the completion of the registration in response to this request (step S613).

Note that the proxy server and the proxy client need not to respectively transmit a Publish message and a Subscribe message in all DWs. Also, the Publish message transmitted by the proxy server may be transmitted in the form of a response to the Subscribe message transmitted by the proxy client. Accordingly, it is possible to suppress a communication band from being occupied by proxy processing.

In this manner, in this embodiment, when the proxy server transmits a Publish message indicating that the proxy server can perform searching and reporting a service as a proxy, the proxy server makes a notification of the proxy service allowable amount (e.g., the number of proxy services that can be registered) as information regarding the capability regarding the proxy service. Accordingly, the proxy client can obtain data for selecting the proxy server. Also, the proxy client can know the proxy service allowable amount in the proxy server before making a request for the proxy service, and the possibility that a request can be made increases even if the number of proxy services for which the proxy client is to make a request is large. As a result, the minimum required number of frames to be transmitted can be reduced, and thus the proxy server and the proxy client can operate with lower power consumption, and the risk of occupying the communication band can also be reduced.

Embodiment 2

In this embodiment, processing performed when the NAN device 101 manages the proxy service allowable amount and makes a response to the request made by the NAN device 102 is described.

Operations of Proxy Server

Figure 8:
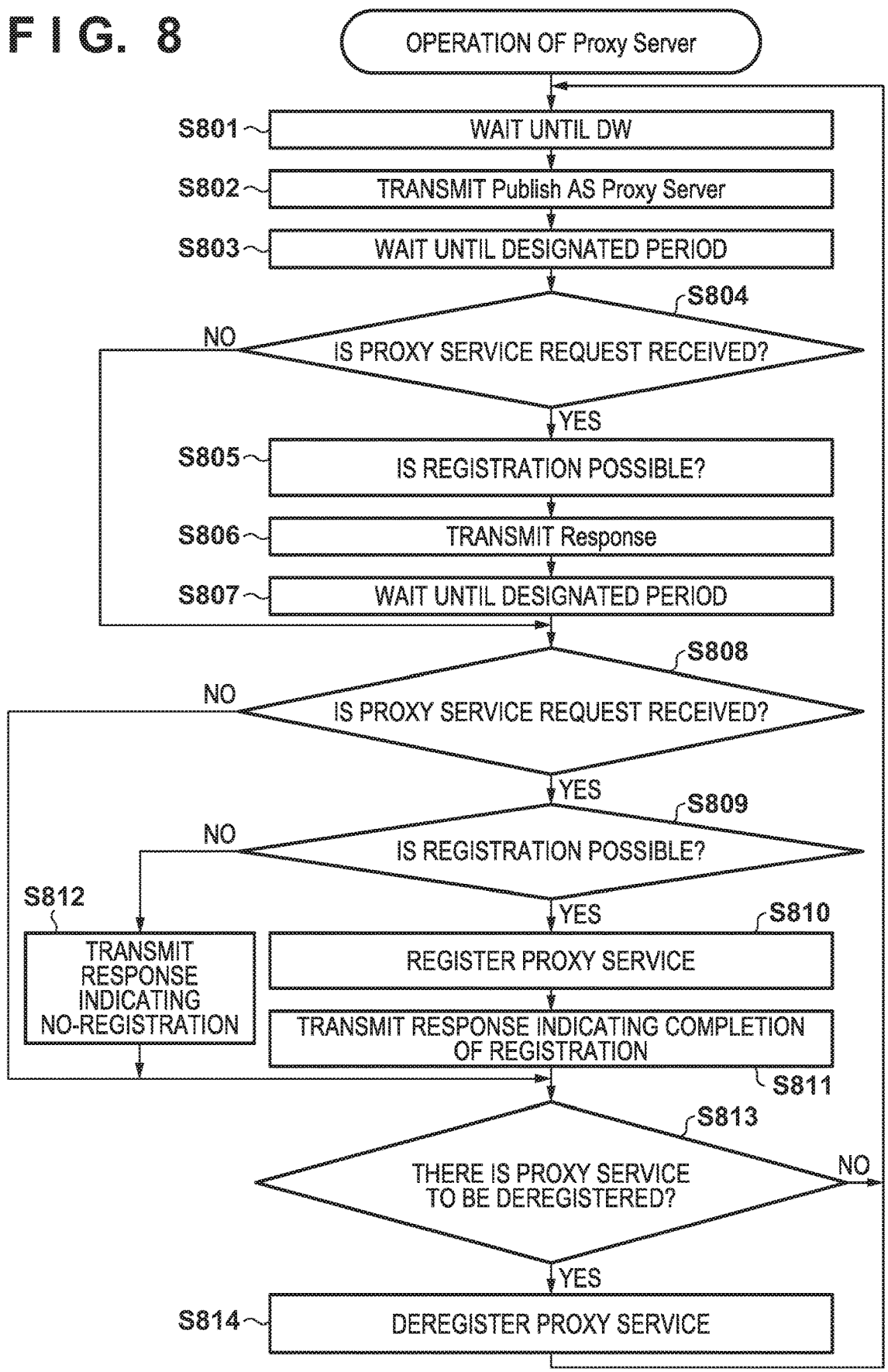
FIG. 8 is a flowchart of operations of a proxy server in Embodiment 2.

A flowchart of operations of the NAN device 101 (proxy server) in this embodiment is shown in FIG. 8. The flowchart shown in FIG. 8 is realized as a result of a controller 302 of the NAN device 101 executing a control program stored in a storage unit 301 and executing calculation and processing on information and controlling of hardware. Note that a configuration may be adopted in which a portion or all of the steps shown in the flowchart shown in FIG. 8 may be realized by hardware such as an ASIC, for example. This processing can be started at a point of time when the NAN device 101 joins the NAN cluster 105 and starts operation as the proxy server. Although the processing of the NAN device 101 will be described hereinafter, the NAN device 103 also can perform similar processing.

First, after the NAN controller 202 of the NAN device 101 has waited until the next DW (step S801), the NAN controller 202 makes a report to the surroundings in the Publish message that the NAN device 101 can operate as a proxy server (step S802). At this time, the NAN device 101 may use the frame shown in FIG. 7, or may make a report of a frame obtained by removing the Sub-Attribute from the frame shown in FIG. 7.

Then, in a case where a period for receiving a request (referred to as a request reception period hereinafter) is designated in the Publish message, the NAN device 101 waits the request reception period, or if the request reception period is not designated, waits until the next DW (step S803). Note that a method for designating the request reception period is similar to the method for designating the proxy service registration period described in Embodiment 1, and thus a description thereof is omitted. Then, the NAN controller 202 of the NAN device 101 determines whether or not a request is received from the proxy client in the request reception period (step S804). In a case where the NAN device 101 has not received the request (No in step S804), the processing moves to step S808. Here, in a case of No in step S804, the processing may move to step S813. Also, similarly to step S404 shown in FIG. 4 described in embodiment 1, the NAN device 101 may check whether or not a Subscribe message is received.

In a case where the request has been received (Yes in step S804), the allowable amount management unit 204 of the NAN device 101 checks the allowable amount of a proxy service thereof (step S805). Then, the NAN controller 202 of the NAN device 101 enters the proxy service allowable amount in the response and transmits the response (step S806). At this time, the NAN device 101 may enter other information in the response. The NAN device 101 may transmit information regarding the proxy service for which another terminal has made a request, or the number of other proxy terminals, for example. Alternatively, the NAN device 101 may transmit a registration status of the proxy service for which the proxy client has made a request. The NAN device 101 can use the frame shown in FIG. 12 at this time.

Figure 12:
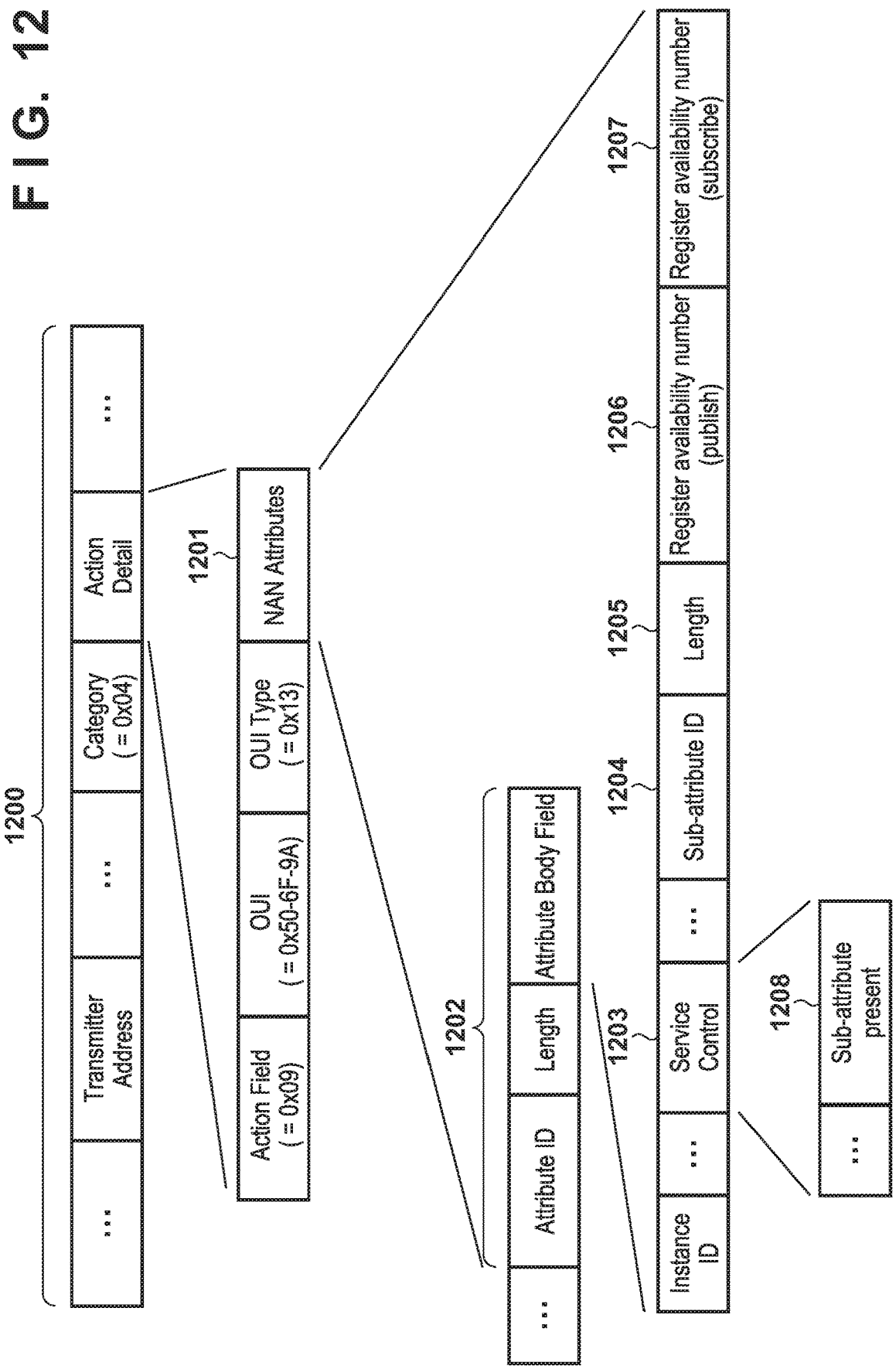
FIG. 12 shows an example of a frame configuration of a response regarding a proxy service in Embodiment 2.

FIG. 12 shows an example of a frame configuration of a response regarding a proxy service transmitted by the NAN device 101. Note that information shown in FIG. 12 may be transmitted using another signal (timing). In a case where the NAN device 101 operates as the Master, for example, these pieces of information may be transmitted using a Sync Beacon or Discovery Beacon. Alternatively, a Publish message or Follow up message, which is an SDF, or a frame used when data is transmitted after a NAN data link is established may be utilized. Alternatively, a frame used for a proxy service registration completion notification, registration request, or the like may be used.

The Public Action Frame of the IEEE802.11 standard is used as the SDF. The SDF includes NAN Attributes 1201 for adding information defined in a portion of the Public Action Frame. A Service Descriptor Extension Attribute obtained by extending a Service Descriptor Attribute indicating details of a service that is to be searched for is included in one of the plurality of Attributes 1202. Note that other Attributes may be used or used in combination in order to indicate that a NAN device is joining another network. In the example shown in FIG. 12, a Service Control field 1203 of the Service Descriptor Extension Attribute indicates the provision of a Sub-attribute. Note that the 10th bit is used in order to indicate that the Sub-attribute is present (Sub-attribute present 1208), for example. The Sub-Attributes (reference numerals 1204 to 1207) are provided to the Service Descriptor Extension Attribute based thereon. Because the Sub-Attributes are the same as those of the inside of the frame shown in FIG. 7, a description thereof is omitted.

Note that similarly to the frame shown in FIG. 7, with regard to this frame, an Attribute in which a period is designated may be additionally provided. In a case where no Attribute is provided, it can be indicated that the designated period does not change. Even in a case where a new Attribute is provided, a change in the period is not enforced.

Return to FIG. 8. After the NAN controller 202 of the NAN device 101 has transmitted a response (step S806), the NAN controller 202 waits until the proxy service registration period designated in the Publish message or another method. Then, the NAN controller 202 of the NAN device 101 determines whether or not a proxy service request (registration request) has been received (step S808). In a case where the proxy service request has not been received (No in step S808), the processing moves to step S813. In a case where the proxy service request has been received (Yes in step S808), the NAN Proxy Server controller 203 of the NAN device 101 analyzes the request content, and determines whether or not this service can be accepted and registered. That is, the NAN device 101 determines whether searching or reporting can be performed as a proxy (step S809). If the service can be registered (Yes in step S809), the proxy allowable amount management unit 204 of the NAN device 101 registers the proxy service (step S810), and the NAN controller 202 transmits a response indicating that the service has been registered (step S811). If the service cannot be registered (No in step S809), the NAN controller 202 of the NAN device 101 transmits a response indicating that the service has not been registered (step S812).

Then, the proxy allowable amount management unit 204 of the NAN device 101 checks whether there are any registered proxy services that are to be deregistered due to the expiration (step S813). In a case where there is a proxy service to be deregistered (Yes in step S813), the proxy allowable amount management unit 204 of the NAN device 101 deregisters the proxy service (step S814). If there is no proxy service to be deregistered (No in step S813), the processing returns to step S801, and the NAN device 101 starts to make a report of the service to the proxy client again. In a case where one proxy service is newly registered through this series of processes, the reserve amount decreases from 5 to 4, for example. In contrast, in a case where there is one proxy service that is to be deregistered, the reserve amount increases from 5 to 6, for example.

Operations of Proxy Client

Figure 9:
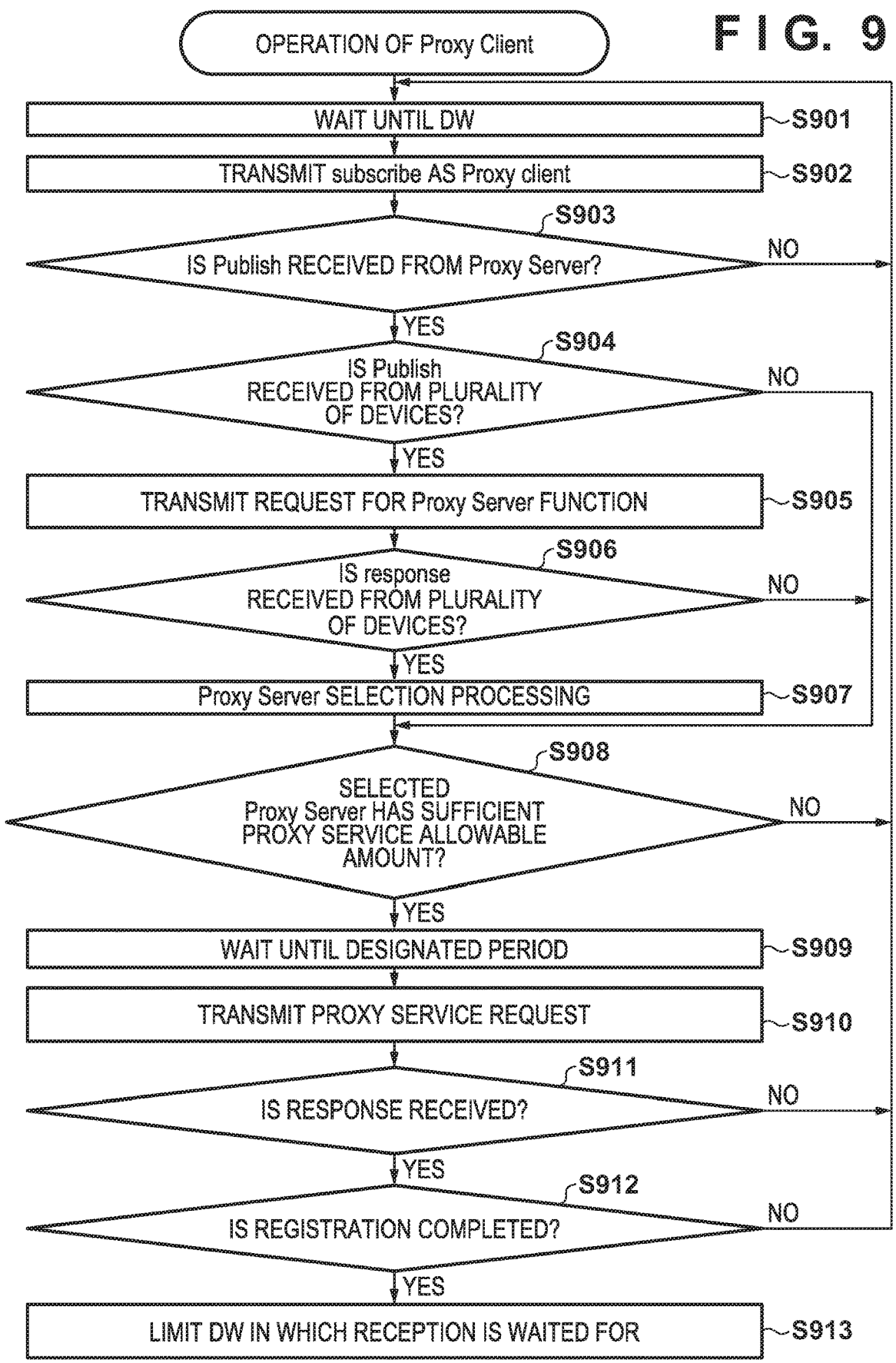
FIG. 9 is a flowchart of operations of a proxy client in Embodiment 2.

A flowchart of operations of the NAN device 102 (proxy client) in this embodiment is shown in FIG. 9. Specifically, FIG. 9 shows processing regarding the NAN device 102 accepting the allowable amounts of proxy services from the NAN device 101 and the NAN device 103 and selecting a proxy server to which a request for a proxy is made. Note that the reserve amounts of the proxy services of the NAN device 101 are set to 5 for Publish and 5 for Subscribe here. On the other hand, the reserve amounts of the proxy services of the NAN device 103 are set to 3 for Publish and 2 for Subscribe. Also, it is assumed that the NAN device 102 makes a request for reporting a printer service that is a service of the NAN device 102 as a proxy.

The flowchart shown in FIG. 9 is realized as a result of the controller 302 of the NAN device 102 executing a control program stored in the storage unit 301 and executing calculation and processing on information and controlling of hardware. Note that a configuration may be adopted in which a portion or all of the steps shown in the flowchart shown in FIG. 9 may be realized by hardware such as an ASIC, for example. This processing can be started at a point of time when the NAN device 102 joins the NAN cluster 105 and starts operation as the proxy client.

First, the NAN controller 212 of the NAN device 102 waits until a DW (step S901), and then makes an indication with a Subscribe message that the NAN controller 212 is to make a request for searching and reporting a service as a proxy therefor (that is, is searching for a proxy server) (step S902). Note that this process may be omitted. Then, the NAN controller 212 of the NAN device checks whether or not a Publish message indicating that a proxy server function is provided has been received (step S903). Then, the NAN controller 212 of the NAN device 102 determines whether or not Publish messages indicating that the proxy server function is provided have been received from the plurality of NAN devices (step S904). Note that this process may be omitted. In a case where the Publish messages have been received from the plurality of proxy servers (NAN devices 101 and 103) (Yes in step S904), the NAN proxy client controller 213 of the NAN device 102 makes a request regarding the capability of the proxy server in order to check the proxy service allowable amount of the proxy server. Here, the frame shown in FIG. 11 is used for this request, for example.

Figure 11:
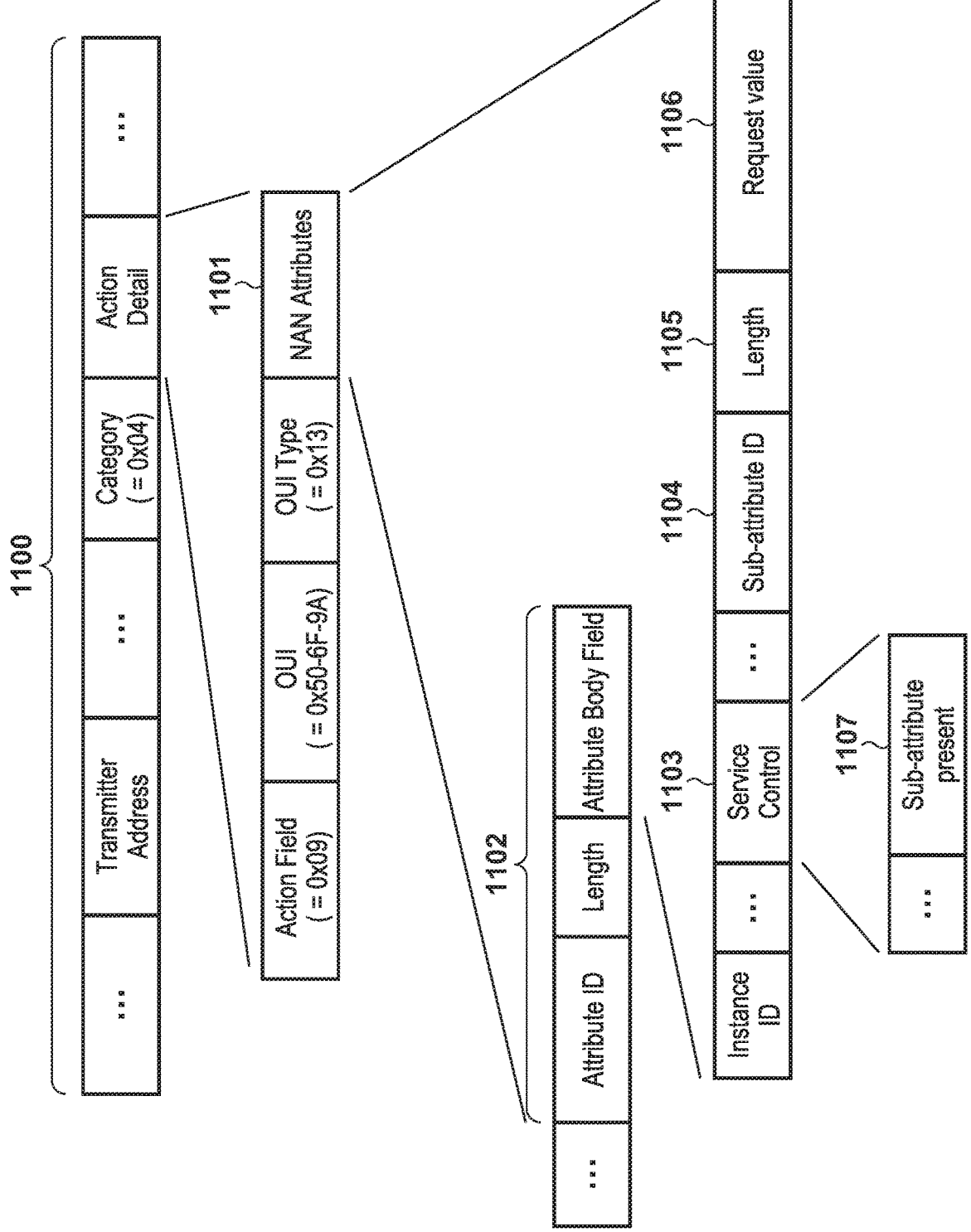
FIG. 11 shows an example of a frame configuration of a request regarding a proxy service in Embodiment 2.

FIG. 11 shows an example of a frame configuration of a request regarding a proxy service transmitted by the NAN device. Information shown here may be transmitted using another signal (timing). In a case where the NAN device 102 operates as the Master, for example, these pieces of information may be transmitted using a Sync Beacon or Discovery Beacon. Alternatively, a Subscribe or Follow up message, which is an SDF, or a frame used when data is transmitted after a NAN data link is established may be utilized. Alternatively, a frame used for a proxy service registration completion notification, registration request, or the like may be utilized.

The main configuration of the request frame shown in FIG. 11 is the same as the configurations shown in FIGS. 7 and 12, and thus a description thereof is omitted. However, contents (reference numerals 1104 to 1106) relating to the Sub-Attributes in FIG. 11 are different therefrom. The ID indicating that a request for the proxy server function is made is written in the Sub-attribute ID 1104. 0x06 is written in the Sub-attribute ID 1104, for example. The length of the Sub-Attribute is written in the Length 1105, for example. 0x02, which indicates the length of the subsequent Request Value, is written in the Length 1105, for example. Which value is to be requested next is written in the Request value 1106. The Request value 1106 is managed bit by bit. In a case where the first bit is 1, for example, it means that the proxy service reserve amount for Publish is requested. Similarly, the service reserve amount for Subscribe is designated in the 2nd bit, the number of registered terminals is designated in the 3rd bit, a registered service is designated in the 4th bit, and a proxy service registration status of the NAN device is designated in the 5th bit, for example. The proxy server transmits a response in accordance with this request (step S806 in FIG. 8).

Return to FIG. 9. In a case where responses are obtained from a plurality of proxy servers in step S904, the proxy server selection unit 214 of the NAN device 102 performs proxy server selection processing (step S907). Specifically, the proxy server selection unit 214 analyzes the received configuration frame shown in FIG. 12, and selects a proxy server having the largest proxy service allowable amount, out of the proxy servers. Also, in this example, the NAN device 102 makes a request for Publish of a printer service as a proxy, and thus makes the request to the NAN device 101 having a larger Publish proxy service allowable amount. The subsequent processing is the same as the processing shown in FIG. 5 of Embodiment 1, and thus a description thereof is omitted.

Processing Sequence

Figure 10:
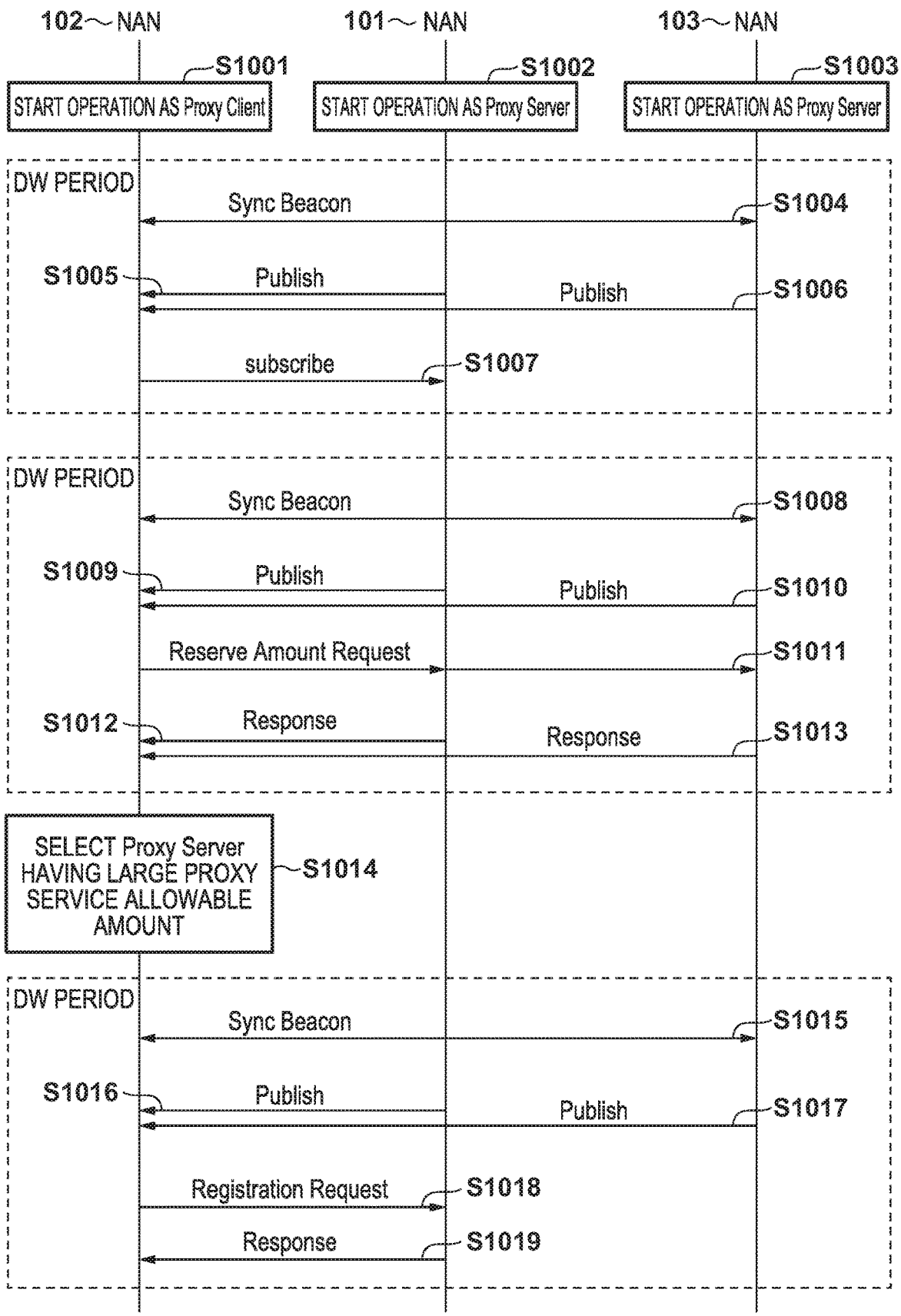
FIG. 10 is a diagram of a processing sequence in Embodiment 2.

Next, a sequence until a proxy request is completed in the processing shown in FIGS. 8 and 9 is shown in FIG. 10. The processing up to step S1010 is the same as that of FIG. 6 of Embodiment 1, and thus a description thereof is omitted. The NAN device 102 has receive Publish messages from a plurality of NAN devices, and thus makes requests for proxy service allowable amounts to the respective NAN devices (step S1011). The frame having the configurations shown in FIG. 11 is used for this request, for example. Here, the NAN device 102 may transmit the requests once for each of the NAN device 101 and the NAN device 103, or collectively transmit the requests in the form of Multicast or Broadcast. The NAN device 101 and the NAN device 103 each returns a response to the transmitted request (step S1012 and step S1013). Because the NAN device 102 has received responses from a plurality of devices, the NAN device 102 performs processing for selecting a proxy server to which a request for a proxy service is made (step S1014). Here, because the NAN device 101 has a larger Publish proxy service reserve amount, the NAN device 102 selects the NAN device 101 as the proxy server. Because the proxy service registration period is not designated in the Publish message, the NAN device 102 waits until the next DW, and then transmits a proxy service request (registration request) (step S1018). The NAN device 101 determines whether the proxy service can be registered internally, and when the proxy service is registered, transmits a response indicating the completion of the registration in response to this request (step S1019). Note that the proxy service allowable amount request and response may be made out of the DW periods. Also, the registration request and response may be made out of the DW periods.

In this manner, according to this embodiment, the proxy client can check the proxy service allowable amount as information regarding the capability of the proxy service of the proxy server when needed. Also, when the proxy client needs information other than the proxy service allowable amount, the proxy client can check this information as well. It is conceivable that examples of such information include what other proxy services the proxy server searches for or makes a report of, and the number of proxy services. Accordingly, in a case where the proxy servers have registered the proxy service with the same service name, the proxy client can collectively make requests for reporting the services. Also, the proxy client can acquire the number of proxy services that are currently registered in the proxy server. Accordingly, if it is assumed that the proxy server in which a larger number of services are registered can perform many services as a proxy, and is reliable, the proxy client can select a proxy server with a higher reliability, for proxy registration.

Note that although a notification of the proxy service allowable amount is made using a Publish message or a response to a request in this embodiment, the present invention is not limited thereto. The proxy server may make a notification of the proxy service allowable amount when making a response to a registration request, for example. Accordingly, when the proxy client is to newly register a proxy service after a proxy service is registered, the proxy client can effectively utilize information regarding the proxy service allowable amount. Alternatively, the proxy server makes a notification of the proxy service allowable amount together with reasons for the registration refusal, and thus such a notification is useful information for the proxy client to analyze the reason for the registration refusal.

Also, a configuration may be adopted in which a notification of the maximum allowable amount of a proxy service that can be processed by the proxy server is made. Accordingly, the proxy client can make a registration request based on the proxy service maximum allowable amount, for example. That is, it is possible to make a registration request based on the proxy service processing capability of the proxy server.

Also, as a result of making a notification of information regarding the maximum allowable amount with information regarding the proxy service allowable amount, the proxy client can make a registration request in view of a processing load of the proxy server.

Also, a notification of the proxy service allowable amount can be made by making a notification of the maximum allowable amount of a proxy service that can be processed by the proxy server and the amount of a proxy service that has already been processed by the proxy server. This is because the proxy client can know the proxy service allowable amount by subtracting the amount of the proxy service that has already been processed by the proxy server from the maximum allowable amount.

According to the present invention, a proxy client can grasp information regarding the capability of a proxy service of a proxy server.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
   one or more processors; and
   one or more memories including stored instructions that, when executed by the one or more processors, cause the communication apparatus to:
   perform a proxy process, in which at least one of reception or transmission of a predetermined radio signal is performed as a proxy for another communication apparatus, at a predetermined time period that occurs periodically, and notify, in the predetermined time period that occurs periodically, a first amount of proxy processes that is able to be performed additionally by the communication apparatus, wherein the first amount is determined based on a second amount of proxy processes that the communication apparatus has performed.

2. The communication apparatus according to claim 1, wherein in a case where performing reception or transmission of the predetermined radio signal is handled as one service, the communication apparatus notifies the first amount using units of the service.

3. The communication apparatus according to claim 1, wherein the communication apparatus notifies the first amount using units of a size of a packet that can be transmitted by the communication apparatus at one time.

4. The communication apparatus according claim 1, wherein the communication apparatus notifies the first amount by including a value of the first amount in a signal indicating that at least one of reception and transmission of the predetermined radio signal can be performed as a proxy.

5. The communication apparatus according to claim 1, wherein the communication apparatus notifies the first amount in a case where the communication apparatus has received, from the other communication apparatus, a request for performing at least one of reception and transmission of the predetermined radio signal as a proxy.

6. The communication apparatus according to claim 1, wherein the communication apparatus notifies the first amount in a case where the communication apparatus has received, from the other communication apparatus, a request for information regarding the first amount.

7. The communication apparatus according to claim 1, wherein the instructions further cause, when executed by the one or more processors, the communication apparatus to determine whether or not, in a case where a request for performing at least one of reception and transmission of the predetermined radio signal as a proxy has been received from the other communication apparatus, the request is accepted, based on the first amount.

8. The communication apparatus according to claim 7, wherein the instructions further cause, when executed by the one or more processors, the communication apparatus to transmit, in a case where the communication apparatus has determined that the request is accepted, a signal indicating that the request is registered, and to transmit, in a case where the communication apparatus has determined that the request is not accepted, a signal indicating that the request is refused.

9. The communication apparatus according to claim 1, wherein the communication apparatus is a communication apparatus conforming to NAN (Neighbor Awareness Networking).

10. A method for controlling a communication apparatus, the method comprising:

performing a proxy process, in which at least one of reception or transmission of a predetermined radio signal is performed as a proxy for another communication apparatus, at a predetermined time period that occurs periodically, and notifying, in the predetermined time period that occurs periodically, a first amount of proxy processes that is able to be performed additionally by the communication apparatus, wherein the first amount is determined based on a second amount of proxy processes that the communication apparatus has performed.

11. A non-transitory computer-readable storage medium storing a computer program for causing a computer to execute a method for controlling a communication apparatus, the method comprising:

performing a proxy process, in which at least one of reception or transmission of a predetermined radio signal is performed as a proxy for another communication apparatus, at a predetermined time period that comes periodically, and notifying, in the predetermined time period that comes periodically, a first amount of proxy processes that is able to be performed additionally by the communication apparatus, wherein the first amount is determined based on a second amount of proxy processes that the communication apparatus has performed.

12. A communication apparatus capable of making a request for performing at least one of reception or transmission of a predetermined radio signal as a proxy to one or more other communication apparatuses, the communication apparatus comprising:

one or more processors; and one or more memories including stored instructions that, when executed by the one or more processors, cause the communication apparatus to:

receive, in a predetermined time period that occurs periodically and from each of the one or more other communication apparatuses, a first amount of proxy processes that is able to be performed additionally by each of the one or more other communication apparatuses, wherein at least one of reception or transmission of the predetermined radio signal is performed in the proxy processes, and the first amounts from each of the one or more other communication apparatuses is determined based on a second amount of proxy processes that each of the other communication apparatuses has performed; and select a communication apparatus to which a request for the proxy is made, from the one or more other communication apparatuses, based on the received first amounts.

13. The communication apparatus according to claim 12, wherein, in a case where performing at least one of reception or transmission of the predetermined radio signal is handled as one service, the communication apparatus receives the first amounts in units of the service.

14. The communication apparatus according to claim 12, wherein the communication apparatus receives the first amounts in units of a size of a packet that can be transmitted by each of the one or more other communication apparatuses at one time.

15. The communication apparatus according claim 12, wherein the instructions further cause, when executed by the one or more processors, the communication apparatus to transmit a request for the first amounts to the one or more other communication apparatuses, wherein the communication apparatus receives the first amounts as a response to transmission of the request.

16. The communication apparatus according to claim 12, wherein the instructions further cause, when executed by the one or more processors, the communication apparatus to transmit a request for performing at least one of reception or transmission of the predetermined radio signal as a proxy to the one or more other communication apparatuses, wherein the communication apparatus receives the first amounts as a response to transmission of the request.

17. A method for controlling a communication apparatus capable of making a request for performing at least one of reception or transmission of a predetermined radio signal as a proxy to one or more other communication apparatuses, the method comprising:

receiving, in a predetermined time period that occurs periodically and from each of the one or more other communication apparatuses, a first amount of proxy processes that is able to be performed additionally by each of the one or more other communication apparatuses, wherein at least one of reception or transmission of the predetermined radio signal is performed in the proxy processes, and the first amount from each of the one or more other communication apparatuses is determined based on a second amount of proxy processes that each of the one or more other communication apparatuses has performed; and selecting a communication apparatus to which a request for the proxy is made, from the one or more other communication apparatuses, based on the received first amounts.

18. A non-transitory computer-readable storage medium storing a computer program for causing a computer to execute a method for controlling a communication apparatus capable of making a request for performing at least one of reception or transmission of a predetermined radio signal as a proxy to one or more other communication apparatuses, the method comprising:

receiving, in a predetermined time period that occurs periodically and from each of the one or more other communication apparatuses, a first amount of proxy processes that is able to be performed additionally by each of the one or more other communication apparatuses, wherein at least one of reception or transmission of the predetermined radio signal is performed in the proxy processes, and the first amount from each of the one or more other communication apparatuses is determined based on a second amount of proxy processes that each of the one or more other communication apparatuses has performed; and selecting a communication apparatus to which a request for the proxy is made, from the one or more other communication apparatuses, based on the received first amounts.

* * * * *